United States Patent
Fraser et al.

(10) Patent No.: US 11,551,557 B2
(45) Date of Patent: Jan. 10, 2023

(54) VEHICLE MULTI-COMMUNICATION MESSAGE TYPE COMMUNICATION SYSTEM

(71) Applicant: Honeywell International Inc., Morris Plains, NJ (US)

(72) Inventors: Andrew James Fraser, Chandler, AZ (US); Thomas D. Judd, Woodinville, WA (US)

(73) Assignee: Honeywell International Inc., Charlotte, NC (US)

( * ) Notice: Subject to any disclaimer, the term of this patent is extended or adjusted under 35 U.S.C. 154(b) by 596 days.

(21) Appl. No.: 16/189,871

(22) Filed: Nov. 13, 2018

(65) Prior Publication Data

US 2020/0152070 A1    May 14, 2020

(51) Int. Cl.
| | |
|---|---|
| *G08G 5/00* | (2006.01) |
| *H04W 4/44* | (2018.01) |
| *H04L 47/2408* | (2022.01) |
| *H04W 88/06* | (2009.01) |
| *H04W 88/16* | (2009.01) |

(52) U.S. Cl.
CPC ....... *G08G 5/0013* (2013.01); *H04L 47/2408* (2013.01); *H04W 4/44* (2018.02); *H04W 88/06* (2013.01); *H04W 88/16* (2013.01)

(58) Field of Classification Search
CPC ...... G08G 5/0013; H04W 4/44; H04W 88/06; H04W 88/16; H04L 47/2408
See application file for complete search history.

(56) References Cited

U.S. PATENT DOCUMENTS

| | | |
|---|---|---|
| 7,295,344 B2 | 11/2007 | Adachi |
| 7,395,344 B2 | 7/2008 | Sandell et al. |
| 7,519,014 B2 | 4/2009 | Allen et al. |

(Continued)

FOREIGN PATENT DOCUMENTS

| | | |
|---|---|---|
| EP | 2903180 A1 | 8/2015 |
| FR | 2920622 A1 | 3/2009 |
| WO | 2006026632 A1 | 3/2006 |

OTHER PUBLICATIONS

European Patent Office, "Extended European Search Report from Application No. 19208206.3", from Foreign Counterpart to U.S. Appl. No. 16/189,871, dated Feb. 24, 2020, pp. 1-7, Published: EP.

*Primary Examiner* — Navid Z. Mehdizadeh
(74) *Attorney, Agent, or Firm* — Fogg & Powers LLC

(57) ABSTRACT

A vehicle communication system including a communication management unit (CMU) and a data gateway is provided. The CMU is at least in part configured to route first type messages using a first type message communication. The data gateway is configured to communicate second type messages to a remote location. The CMU is configured to route at least some of the first type messages to the data gateway. The data gateway is configured to communicate a pseudo acknowledgment for each message block of each first type message routed to the data gateway back to the CMU indicating the message block was received by a designated remote location. The data gateway is further configured to interface each received first type message into the second type message and communicate each second type message to the designated remote location using a second type of message communication.

20 Claims, 3 Drawing Sheets

(56) References Cited

U.S. PATENT DOCUMENTS

| | | | |
|---|---|---|---|
| RE41,941 E | 11/2010 | Eckert et al. | |
| 8,228,911 B2 | 7/2012 | Cheriyath et al. | |
| 8,285,865 B2 | 10/2012 | Gruyer et al. | |
| 8,484,384 B2 | 7/2013 | Tamalet et al. | |
| 2002/0133596 A1* | 9/2002 | Border | H04L 45/22 709/227 |
| 2009/0058682 A1 | 3/2009 | True | |
| 2010/0217889 A1 | 8/2010 | Simcoe et al. | |
| 2011/0047281 A1* | 2/2011 | Gruyer | H04L 12/4633 709/230 |
| 2012/0295537 A1* | 11/2012 | Zaruba | H04B 7/18506 455/12.1 |
| 2012/0303747 A1* | 11/2012 | Emberger | H04B 7/18506 709/217 |
| 2016/0211907 A1 | 7/2016 | Nelson et al. | |
| 2018/0227272 A1* | 8/2018 | Zaruba | H04L 63/061 |

\* cited by examiner

VEHICLE MULTI-COMMUNICATION MESSAGE TYPE COMMUNICATION SYSTEM

BACKGROUND

Vehicles, such as but not limited to, aircraft may use more than one type of communication system when communicating with remote locations. An example communication system used in an aircraft is an aircraft communication addressing and reporting system (ACARS). ACARS is an aircraft to/from ground system communication system used to communicate relatively short messages between the aircraft and ground end systems via airband radio or satellite such as Very High Frequency (VHF), High Frequency (HF) and Satellite Communications (SATCOM). ACARS is reliable and secure and therefor used for critical messages (safety messages). Safety messages are high design assurance level information that would be used for such things as navigation, systems control, system health, etc. Although ACARS messages are reliable and secure, they are costly and not ideal for sending large messages or large quantities of non-safety messages. Protocol used with ACARS messages only sends one message block at a time where a message may include one to sixteen blocks. Because of this approach, the message is limited by having to wait for each message/message block to be acknowledged (from the peer on the ground for downlink or peer CMU on the aircraft for uplink) before it can send another. This problem of per message block acknowledgement is particularly impactful when using SATCOM (even high bandwidth SATCOM) as the latency on message transmission over geostationary satellites can be relatively high (for example, the latency may be 500 msec or more for the full round trip of the message/acknowledgement).

Other available communications systems used by aircraft may include Wi-Fi, cellular and/or broadband SATCOM that allow internet protocol (IP) broadband links. Communications through these systems, when available, provide higher-bandwidth and are cheaper. However communication signals used in these communication systems are only allowed to communicate low design assurance level information and are not approved to transmit ACARS safety messages.

SUMMARY

The following summary is made by way of example and not by way of limitation. It is merely provided to aid the reader in understanding some of the aspects of the subject matter described. Embodiments provide a system that communicates non-safety ACARS messages via faster communication path to a desired remote location by generating a pseudo acknowledgement that tricks a controller unit of the vehicle into believing the message has been received and acknowledged at the desired remote location and converting the ACARS message to a different type of message that is communicated to the remote location.

In one embodiment, a vehicle communication system including a communication management unit (CMU) and a data gateway is provided. The CMU is at least in part configured to route first type messages using a first type message communication. The data gateway is configured to communicate second type messages to a remote location. The CMU is configured to route at least some of the first type messages to the data gateway. The data gateway is configured to communicate a pseudo acknowledgment for each message block of each first type message routed to the data gateway back to the CMU indicating the message block was received by a designated remote location. The data gateway is further configured to interface each received first type message into the second type message and communicate each second type message to the designated remote location using a second type of message communication.

In another example embodiment, a vehicle communication system including a communication unit, a data gateway and a router is provided. The communication unit is configured to communicate with messages of a first type between the vehicle and at least one remote ground end system. The communication unit is also configured to sort the downlink messages to the at least one remote ground end system in at least two different categories. The communication system is further configured to communicate at least first type messages of a first category though a first communication path and first type messages of a second category through a second communication path. The data gateway is in the second communication path. The data gateway is configured to send a pseudo acknowledgement that indicates a ground service provider associated with the at least one remote end system has received a message block of the first type message communicated through the second communication path back to the communication unit. The data gateway is further configured to convert the first type message to a second type message. The router is also in the second communication path. The router is in communication with the data gateway to route second type messages to the at least one remote ground end system.

In yet another embodiment, a method of communicating massages in a downlink direction between a vehicle communication unit and at least one remote ground end system is provided. The method includes sorting first type messages to be downlinked to the at least one remote ground end system into at least a first category and a second category with a communication unit; communicating first type messages of at least the first category through a first communication path to the at least one remote ground end system; communicating first type messages of the second category through a second communication path to the at least one remote ground end system; sending a pseudo acknowledgement that indicates a message block has been received at a ground service provider associated with a designated remote ground end system of the at least one remote ground end system to the communication unit in response to the communication unit communicating the message block of the first type message of the second category through the second communication path; converting the first type message in the second communication path into a second type message; and communicating the converted second type message to the at least one ground end system.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Some, embodiments provide an aircraft communication addressing and reporting system (ACARS) over internet protocol (AOIP) solution that uses an AOIP server that is in communication with a Communication Management Unit (CMU) high frequency (HF) port and is configured to provide AOIP with minimal or no changes to the CMU. These embodiments facilitate excellent ACARS message throughput with an AOIP solution with minimal or no changes to the CMU. The excellent throughput is achieved in part by mitigating throttling factors of ACARS bulk data transmission throughput over satcom such as the high latency of the satellite signals as well as mitigating other network delays. In one embodiment, an AOIP server in a gateway processes a message block from a CMU and send back an ACARS acknowledgements (ACKs) to the CMU. To the CMU, the pseudo ACK that simulates an ACK from an ACARS service provider appears to be coming from the ground. Since, a CMU will only send out a subsequent message block after an ACK is received from a ground location regarding the current message block, an increase in the speed in which the CMU sends out message blocks is achieved.

Figure 1:
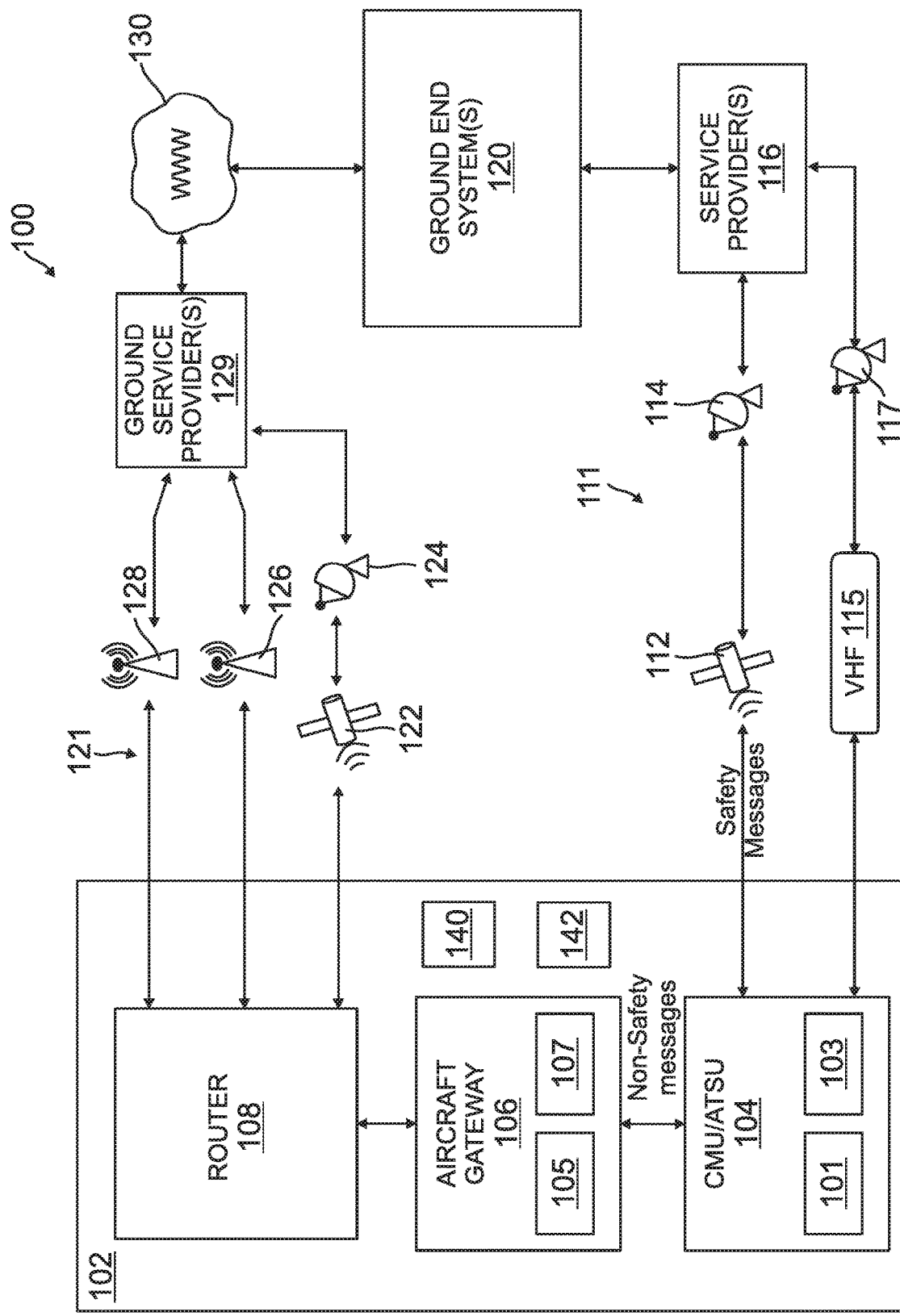
FIG. 1 illustrated a block diagram of a communication system according to one exemplary embodiment.

FIG. 1 illustrates a communication system 100 of one embodiment. The communication system 100 includes remote stations such as ground end systems(s) 120 at designated remote locations and a vehicle communication system 102 that are in communication with each other via two different types of message communications via two different communication paths. Examples of ground end systems 120 include, but are not limited to, air traffic control centers and vehicle operation centers such as aircraft operation centers.

The first communication path 111 is used to communicate messages, including important messages generally called "safety messages," and other "non-safety messages," between the communication system 100 and the ground end systems 120 through one or more ground service providers 116. In one embodiment, the first type messages use ACARS Protocols. Examples of service providers 116 are Aeronautical Radio, Incorporated (ARINC) and Societe Internationale de Telecommunications Aeronautiques (SITA) Datalink (or ACARS) service providers 116 that route ACARS messages between ground end systems 120 and an aircraft communication system 102.

The first communication path 111 is illustrated as a path between a communication unit 104 and the ground end systems 120. In this example, path 111 includes two sub-paths. One sub-path is an ACARS SATCOM communication path and the other path is ACARS VHF communication path. The ACARS SATCOM communication path includes at least one satellite generally designated 112 and a ground transceiver 114 that is in communication with the at least one satellite 112 and a service provider 116, such as a datalink service provider. An example of a datalink service provider includes an ARINC or SITA processing center. The other sub-communication path includes VHF systems 115 that establish communications between the communication unit 104 and the ground end systems 120. In an embodiment, this sub-communication path includes a ground transceiver 117 that is in communication with a service provider, such as but not limited to servicer provider 116, which in turn is in communication with the ground end system 120. The vehicle communication system 102 also includes transceiver systems 140 and antenna systems 142 used to transmit and receive associated communication signals such as the ACARS messages communicated over the first communication path 111.

The communication system 100 further includes a second communication path 121 between the CMU 104 and the ground end systems 120 that provide a cheaper communication link using second type of messages. The second communication path 121 in an example is not approved to communicate "safety messages." In an embodiment, the second type of messages are ACARS over Internet Protocol (AOIP). The second communication path 121 includes in the example of FIG. 1, a data gateway 106 and router 108 that is part of the vehicle communication system 102. The router 108 in this example provides three different communication sub-links to ground service providers 129. Each sub-link may include its own ground service provider 129. For example commination links using GOGO, Cell and WiFi may have their own service providers. The service providers may further be in communication with other customer ground service providers. Each ground service provider 129 in an embodiment may be communication with the World Wide Web (WWW) 130 which in turn is in communication with the ground end systems 120. In some embodiments, there may be a direct communication connection between one of more ground service providers 129 and the ground end systems 120.

The first communication sub-link of the second communication path 121 includes a satellite 124/transceiver 124 arrangement. An example of the first communication sub-link arrangement may be provided by the internet service provider Gogo Inc. A second communication sub-link may include a WiFi link such as a Gatelink 126 that provides communications between the router 108 and the WWW 130. The third example sub-link may include a cellular tower 128 that provides communications between the router 108 and the WWW 130.

The CMU 104 may be an air traffic services unit (ATSU) or other type of communication unit 104 of a vehicle communication system 102. The CMU 104 may include a server 101 or more generally one or more processors or controllers that controls operations of the CMU 104. The CMU 104 may have one or more storage units 103 such as a memory and/or database to store operating instructions implemented by the processor 101 and communication messages. The data gateway 106 further includes a server 105 or more generally one or more processors or controllers that controls operations of the data gateway 106. The data gateway 106 may have one or more storage units 107 such as a memory and/or database to store operating instructions implemented by the processor 105. In one embodiment, instructions implemented by the gateway controller, cause the data gateway 106 to send an ACK message back to the CMU 104 when a first type message is communicated from the CMU 104 to the data gateway 106 as discussed in detail below.

In general, controllers 101 and 105 may include any one or more of a processor, microprocessor, a digital signal processor (DSP), an application specific integrated circuit (ASIC), a field program gate array (FPGA), or equivalent discrete or integrated logic circuitry. In some example embodiments, controllers 101 and 105 may include multiple components, such as any combination of one or more microprocessors, one or more controllers, one or more DSPs, one or more ASICs, one or more FPGAs, as well as other discrete or integrated logic circuitry. The functions attributed to the controllers 101 and 105 herein may be embodied as software, firmware, hardware or any combination thereof. The controller may be part of a system controller or a component controller. The storage medium 101 and 107 may include computer-readable operating instructions that, when executed by the controllers 101 and 105 provides functions of the respective CMU 104 and data gateway 106. The computer readable instructions may be encoded within the storage medium 101 and 107. The storage medium 103 and 107 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

In embodiments, the CMU controller 101 in the CMU 104 sorts messages, which may be ACARS messages in an embodiment, between at least two different category types. For example, the categories may include "safety" and "non-safety" messages. Safety messages, to be downlinked, are directed to the first communication path 111 and non-safety messages may be directed to the second communication path 121. In the second communication path 121, the gateway controller 106 of the gateway 106 implements instructions in the storage medium 107 to seen an ACK back to the CMU 104. The ACK is a pseudo acknowledgement that the designated ground end system 120 has received the message or message block. The CMU 104 receiving the ACK message, then forwards on the next non-safety message or message block to the gateway 106. The gateway controller 106 is also configured to interface the first type message into a second type message and pass it on to the router 108 so it is delivered to a desired ground end system 120 via the second communication path 121. In one embodiment, the gateway controller 106 interfaces a first type ACARS message to a second type AOIP message.

Figure 2:
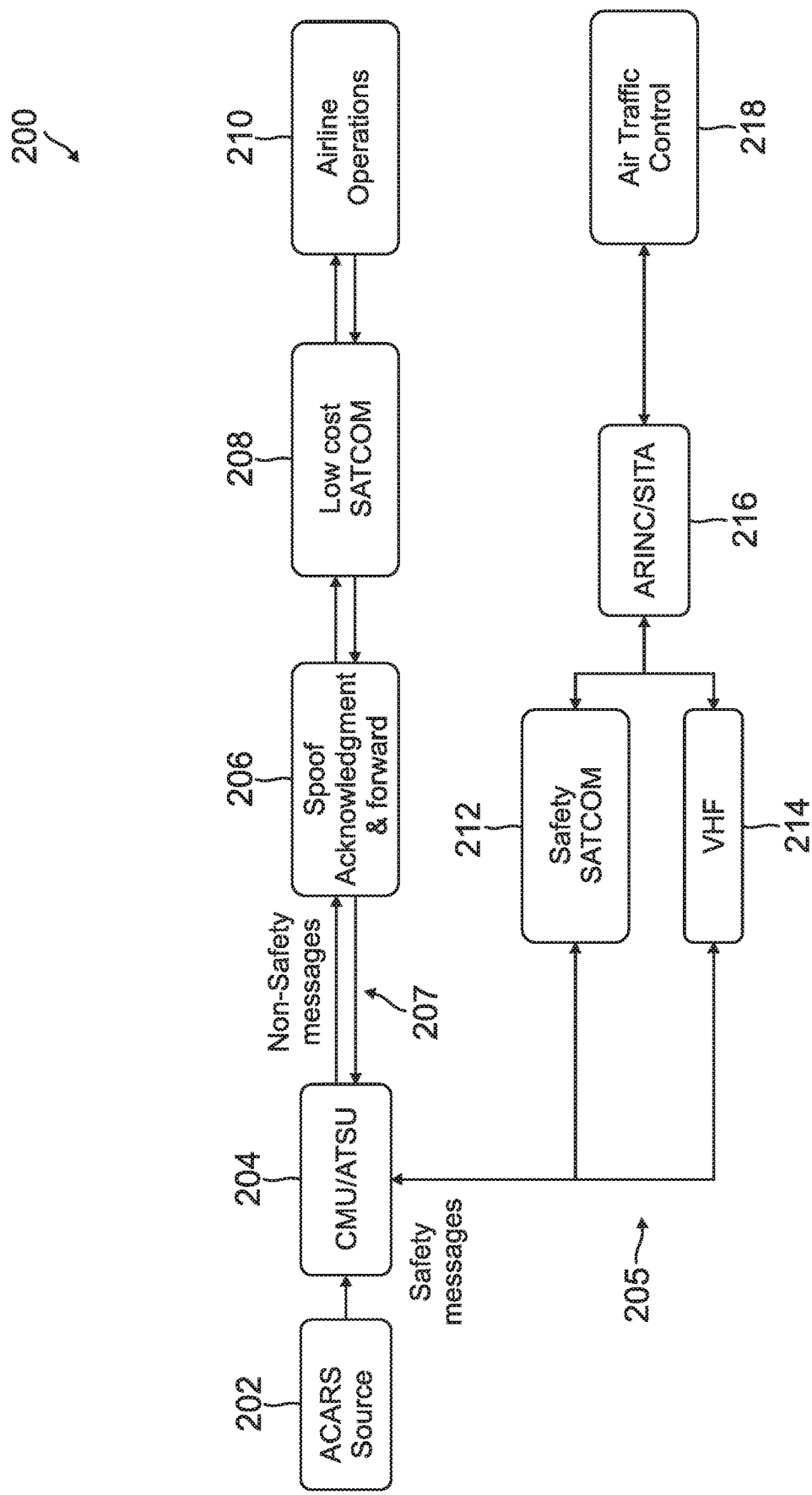
FIG. 2 illustrates a block diagram of another communication system according to one exemplary embodiment.

FIG. 2 illustrates another example embodiment of a communication system 200. In this example, ACARS messages (first type of messages) are provided by an ACARS source 202. The ACARS source 202 may be any type of system on an aircraft such as health monitoring systems, sensor systems, communication systems, etc. The ACARS messages or message blocks are provided to a CMU/ATSU 204. The CMU/ATSU 204 in embodiments may also generate ACARS messages as needed. As discussed above, the CMU/ATSU 204 in an embodiment sorts out safety messages from non-safety messages in the downlink direction. Safety messages are communicated over a first communication path 205 and the non-safety messages are communicated over a second communication path 207. In this example the safety messages communicated over the first communication path 205 may be communicated through at least one of a very high frequency (VHF) system, a satellite communication (SATCOM) system 212 or a high frequency (HF) system (not shown) to a datalink service provider 116 such as, but not limited to, a ARINC/SITA processing system on the ground. The messages are then passed to a remote air traffic control station 218 in this example embodiment. In one embodiment, one of the datalink service provider 216 and the air traffic control station 218 sends the ACK signal back to the CMU/ATSU 204.

Non-safety messages or message blocks are passed from the CMU/ATSU 204 to a spoof acknowledgment and forward message system 206. In one embodiment, system 206 includes a data gateway and router as discussed above in regards to the communication system of FIG. 1. The spoof acknowledgment and forward message system 206 sends an ACK signal back to the CMU/ATSU 204 and forwards the message on through a low cost SATCOM system 208 to a remote airlines operation station 210 in an embodiment. Hence, in an embodiment, the messages may be sorted out to be communicated to different remote end systems in a downlink direction. The ACK signal provided by the spoof acknowledgment and forward message system 206 cause the CMU/ATSU 204 to believe the associated message was received by a desired ground end system so the CMU/ATSU 204 can downlink a further message right away.

Figure 3:
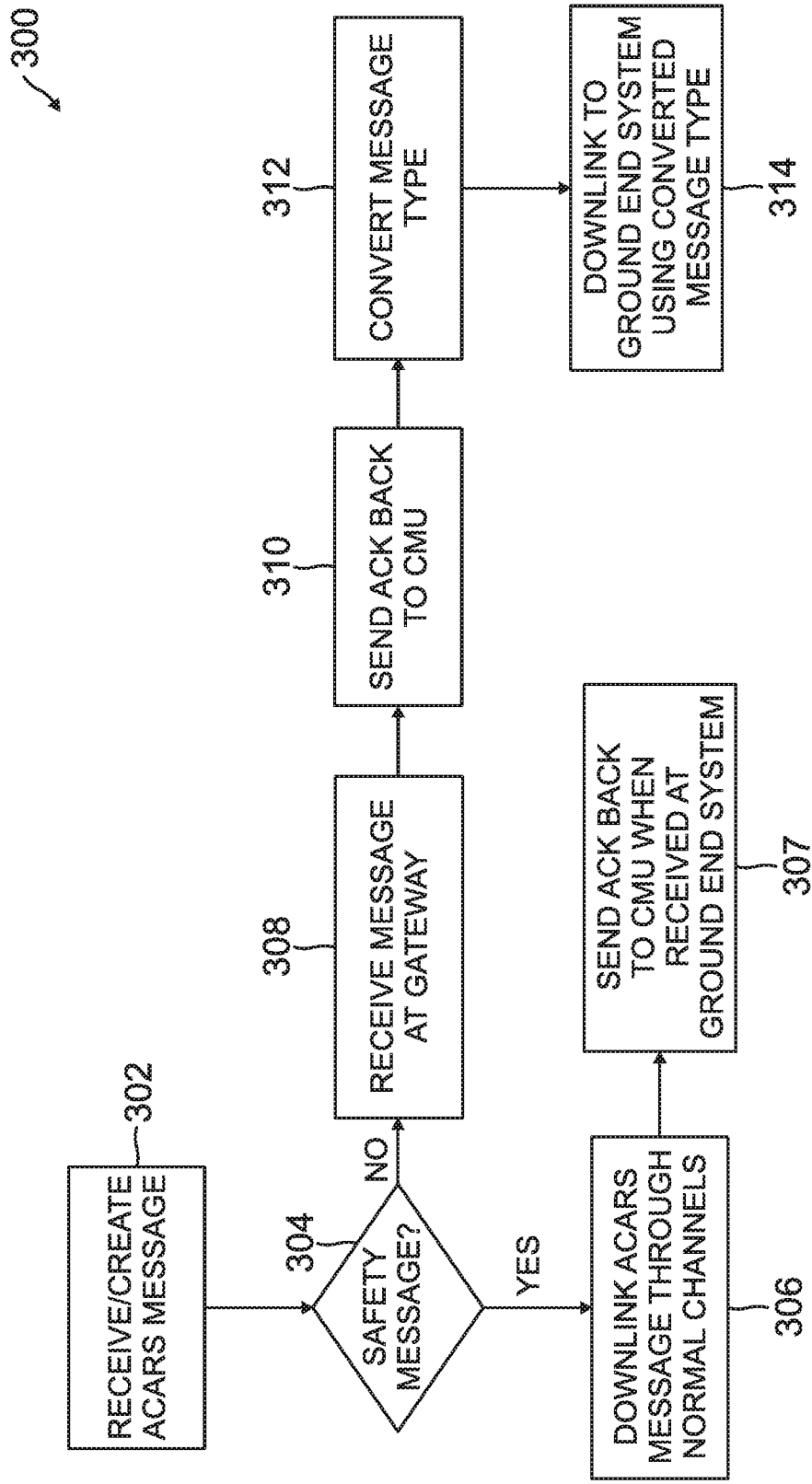
FIG. 3 illustrates a message downlink communication flow diagram according to one exemplary embodiment.

Referring to FIG. 3, a message downlink communication flow diagram 300 of one embodiment is illustrated. Flow diagram 300 is provided as a series of sequential steps. The steps, however, can occur in other sequential orders in other embodiments. Hence, embodiments are not limited to the sequence of step in the example embodiment set out in FIG. 3. The process starts at step (302) where a message of first type is created or received. As discussed above, the first type message may be an ACARS message that is either generated by a CMU or other type of communication control unit or is received by the communication control unit.

The communication control unit then determines if the message is a safety message at step (304). If is determined to be a safety message or message block at step (304), the ASARS message or message block is communicated through a first communication path that is a normal channel for ACARS messages at step (306). An ACARS ACK message is sent back to the CMU once the ACARS message is received at its desired ground end system at step (307). Once the CMU receives the ACK message, the CMU may downlink another safety ACARS message or block via the first communication path at step at (306).

When the CMU determines the ACARS message is a non-safety message at step (304), the ACARS message or ACARS block is passed to a gateway at step 308. The gateway sends an ACARS ACK message back to the CMU at step (310), converts the messages to a second type at step (312) and then communicates the converted message to the desired ground end system at step (314). In one embodiment, the converted message is an AOIP message (or AOIP message block). In an embodiment, the converted message or message block is downlinked right way without delay. The ACK message sent back to the CMU tricks the CMU to think the message has been received and acknowledged by the desired ground service provider so another ACARS message can be sent right away without having to wait until the message is actually received at the desired ground end system. Although a typical sized message may be contained in one block, other messages may require more than one message block. In one embodiment, the gateway 106 may wait a period of time before downlinking converted message blocks. Further in one embodiment, the data gateway 106 waits until all message blocks that form a message are collected and converted before the converted message is sent to the desired ground end system 120.

EXAMPLE EMBODIMENTS

Example 1 is a vehicle communication system including a communication management unit (CMU) and a data gateway. The CMU is at least in part configured to route first type messages using a first type message communication. The data gateway is configured to communicate second type messages to a remote location. The CMU is configured to route at least some of the first type messages to the data gateway. The data gateway is configured to communicate a pseudo acknowledgment for each message block of each first type message routed to the data gateway back to the CMU indicating the message block was received by a designated remote location. The data gateway is further configured to interface each received first type message into the second type message and communicate each second type message to the designated remote location using a second type of message communication.

Example 2, includes the vehicle communication system of Example 1, wherein the data gateway communicates the interfaced second type message by at least one of one message block at a time and after all message blocks of the first type message that completes a message are received at the data gateway.

Example 3 includes the vehicle communication system of any of the Examples 1-2, wherein the vehicle communication system is part of an aircraft communications addressing and repeating system (ACARS), the first type of message communication is an ACARS and the second type of message communication is an ACARS over internet protocol (AOIP).

Example 4 includes the vehicle communication system of any of the Examples 1-3, wherein the data gateway includes an AOIP server. The AOIP server is configured to generate the pseudo acknowledgement of each first type message received.

Example 5 includes the vehicle communication system of Examples 4, wherein the AOIP server further includes at least one processor and at least one storage device to store at least instructions implemented by the at least one processor.

Example 6 includes the vehicle communication system of any of the Examples 1-5, wherein the first type of messages are safety messages and the second type of messages are non-safety messages.

Example 7 includes the vehicle communication system of any of the Examples 1-6, further including a first communication path and second communication path. The first communication path is used to communicate select first type messages to at least one ground end system at the designated remote location from the CMU in a downlink direction. The second communication path is used to communicate the second type messages to the at least one ground end system at the designated remote location from the data gateway in a downlink direction.

Example 8 includes the vehicle communication system of any of the Examples 1-7, wherein the second communication path includes a router that is configured to select between a plurality of available sub-link paths to the at least one ground end system.

Example 9 is a vehicle communication system including a communication unit, a data gateway and a router. The communication unit is configured to communicate with messages of a first type between the vehicle and at least one remote ground end system. The communication unit is also configured to sort the downlink messages to the at least one remote ground end system in at least two different categories. The communication system is further configured to communicate at least first type messages of a first category though a first communication path and first type messages of a second category through a second communication path. The data gateway is in the second communication path. The data gateway is configured to send a pseudo acknowledgement that indicates a ground service provider associated with the at least one remote end system has received a message block of the first type message communicated through the second communication path back to the communication unit. The data gateway is further configured to convert the first type message to a second type message. The router is also in the second communication path. The router is in communication with the data gateway to route second type messages to the at least one remote ground end system.

Example 10 includes the vehicle communication system of Example 9, wherein the first category is safety messages and the second category in non-safety messages.

Example 11 includes the vehicle communication system of any of the Examples 9-10, wherein the first type of message is an aircraft communications addressing and repeating system ACARS and the second type of message is an ACARS over internet protocol (AOIP).

Example 12 includes the vehicle communication system of any of the Examples 9-11, wherein the data gateway is configured to communicate the interfaced second type message by one of one message block at a time without delay and after all message blocks of the first type message that completes a message are received at the data gateway.

Example 13 includes the vehicle communication system of any of the Examples 9-11, wherein the router is configured to select between a plurality of available sub-link paths in communicating the second type messages to the at least one remote ground end system.

Example 14 includes the vehicle communication system of any of the Examples 9-13, wherein the at least one remote ground end system is at least one of an airline operation station and an air traffic control station.

Example 15 includes the vehicle communication system of any of the Examples 9-14, wherein the first path includes at least one of a high integrity satellite communication link and a very high frequency link and the second path include at least one of a low cost satellite communication link and a cellular communication link.

Example 16 includes a method of communicating massages in a downlink direction between a vehicle communication unit and at least one remote ground end system. The method includes sorting first type messages to be downlinked to the at least one remote ground end system into at least a first category and a second category with a communication unit; communicating first type messages of at least the first category through a first communication path to the at least one remote ground end system; communicating first type messages of the second category through a second communication path to the at least one remote ground end system; sending a pseudo acknowledgement that indicates a message block has been received at a ground service provider associated with a designated remote ground end system of the at least one remote ground end system to the communication unit in response to the communication unit communicating the message block of the first type message of the second category through the second communication path; converting the first type message in the second communication path into a second type message; and communicating the converted second type message to the at least one ground end system.

Example 17 includes the method of Example 16, further including using a data gateway in the second communication path to generate the pseudo acknowledgement and to convert the first type message in the second communication path into a second type message.

Example 18 includes the method of any of the Examples 16-17, further including routing second type messages through at least one of a plurality of available sub-link paths in the second communication path to the at least one remote end ground system.

Example 19 includes the method of any of the Examples 16-18, further including sending an acknowledgment back to the communication unit through the first commutation path when the at least one remote ground end system receives a first type message through the first communication path.

Example 20 includes the method of any of the Examples 16-19, wherein the first type of message is an aircraft communications addressing and repeating system ACARS and the second type of message is an ACARS over internet protocol (AOIP).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A vehicle communication system comprising:
 a communication management unit (CMU) at least in part configured to route first type messages using a first type message communication with a first type protocol, the CMU including at least one processor; and
 a data gateway configured to communicate second type messages to a remote location, the CMU configured to route at least some of the first type messages to the data gateway, the data gateway configured to communicate a pseudo acknowledgment for each message block of each first type message routed to the data gateway back to the CMU indicating the message block was received by a designated remote location, the data gateway further configured to convert each received first type message into the second type message and communicate each second type message one message block at a time to the designated remote location using a second type of message communication with a second type protocol.

2. The vehicle communication system of claim 1, wherein each pseudo acknowledgment is communicated back to the CMU by the data gateway when an associated message block is received at the data gateway before receiving confirmation from the remote location that the block was received.

3. The vehicle communication system of claim 1, wherein;
 the vehicle communication system is part of an aircraft communications addressing and reporting system (ACARS);
 the first type of message communication is an ACARS communication; and
 the second type of message communication is an ACARS over internet protocol (AOIP) communication.

4. The vehicle communication system of claim 3, wherein the data gateway includes an AOIP server, the AOIP server configured to generate the pseudo acknowledgement of each first type message received.

5. The vehicle communication system of claim 4, wherein the AOIP server further comprises:
 at least one processor; and
 at least one storage device to store at least instructions implemented by the at least one processor.

6. The vehicle communication system of claim 1, wherein the first type of messages are safety messages and the second type of messages are non-safety messages.

7. The vehicle communication system of claim 1, further comprising:
 a first communication path to communicate select first type messages to at least one ground end system at the designated remote location from the CMU in a downlink direction; and
 a second communication path to communicate the second type messages to the at least one ground end system at the designated remote location from the data gateway in a downlink direction.

8. The vehicle communication system of claim 7, wherein the second communication path includes a router configured to select between a plurality of available sub-link paths to the at least one ground end system.

9. A vehicle communication system comprising:
 a communication unit including at least one processor configured to communicate with messages of a first type having a first type protocol between the vehicle communication system and at least one remote ground end system, the communication unit configured to sort the first type messages to the at least one remote ground end system in at least two different categories, the communication unit further configured to communicate at least first type messages of a first category through a first communication path and first type messages of a second category through a second communication path;
 a data gateway in the second communication path, the data gateway configured to send a pseudo acknowledgement that indicates a ground service provider associated with the at least one remote end system has received a message block of the first type messages communicated through the second communication path back to the communication unit, the data gateway further configured to convert the first type messages to second type messages having a second different protocol; and
 a router in the second communication path, the router in communication with the data gateway to route the second type messages one message block at a time to the at least one remote ground end system.

10. The vehicle communication system of claim 9, wherein the first category is safety messages and the second category is non-safety messages.

11. The vehicle communication system of claim 9, wherein;
 the first type of messages are an aircraft communications addressing and reporting system (ACARS) messages; and
 the second type messages are ACARS over internet protocol (AOIP) messages.

12. The vehicle communication system of claim 9, wherein each pseudo acknowledgment is communicated back to the CMU by the data gateway when an associated message block is received at the data gateway before receiving confirmation from the remote location that the block was received.

13. The vehicle communication system of claim 9, wherein the router is configured to select between a plurality of available sub-link paths in communicating the second type messages to the at least one remote ground end system.

14. The vehicle communication system of claim 9, wherein the at least one remote ground end system is at least one of an airline operation station and an air traffic control station.

15. The vehicle communication system of claim 9, wherein the first communication path includes at least one of a very high frequency link, a high integrity satellite communication link and a high frequency link and the second communication path includes at least one of a low cost satellite communication link, a WiFi communication link and a cellular communication link.

16. A method of communicating messages in a downlink direction between a vehicle communication unit and at least one remote ground end system, the method comprising:
sorting first type messages to be downlinked to the at least one remote ground end system into at least a first category and a second category with a communication unit, the first type messages using a first type protocol;
communicating first type messages of at least the first category through a first communication path to the at least one remote ground end system;
communicating first type messages of the second category through a second communication path to the at least one remote ground end system;
sending a pseudo acknowledgement that indicates a message block has been received at a ground service provider associated with a designated remote ground end system of the at least one remote ground end system to the communication unit in response to the communication unit communicating the message block of the first type messages of the second category through the second communication path;
converting the first type messages in the second communication path into second type messages, the second type messages using a second type protocol; and
communicating the converted second type messages to the at least one remote ground end system one message block at a time.

17. The method of claim 16, further comprising:
using a data gateway in the second communication path to generate the pseudo acknowledgement that indicates the message block has been receive and to convert the first type messages in the second communication path into second type messages.

18. The method of claim 16, further comprising:
routing second type messages through at least one of a plurality of available sub-link paths in the second communication path to the at least one remote ground end system.

19. The method of claim 16, further comprising:
sending an acknowledgment back to the communication unit through the first communication path when the at least one remote ground end system receives a first type message through the first communication path.

20. The method of claim 16, wherein the first type messages are aircraft communications addressing and reporting system (ACARS) messages and the second type messages are ACARS over internet protocol (AOIP) messages.

* * * * *